Dec. 8, 1964     H. D. KAZAKOWITZ     3,160,439

HAND DUMP TRUCK

Filed June 27, 1963     3 Sheets-Sheet 1

INVENTOR
HARRY KAZAKOWITZ

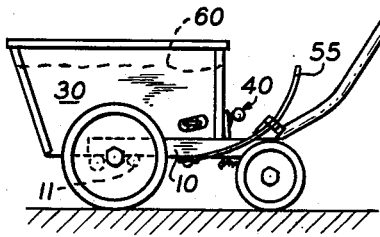
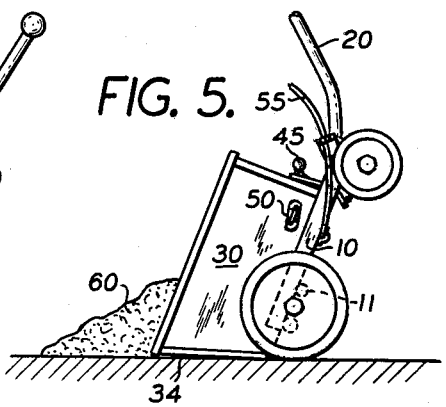
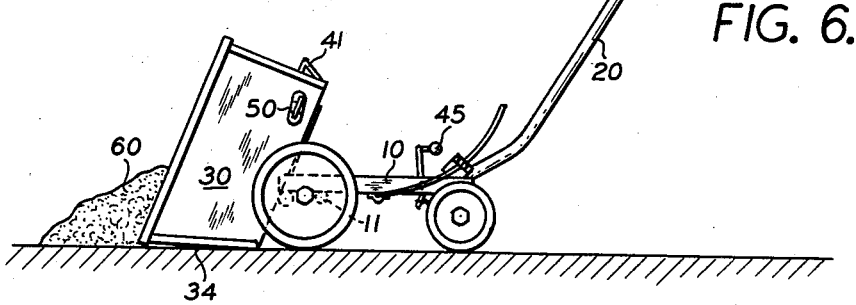
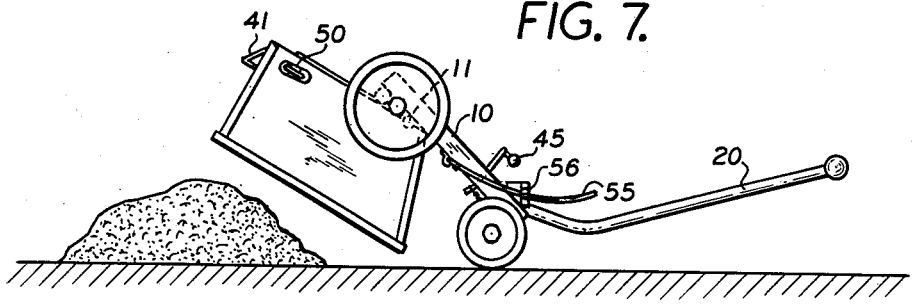
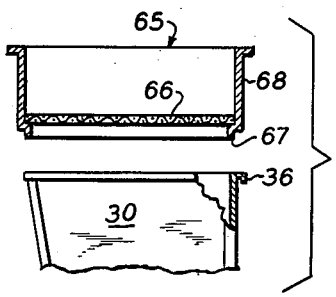
INVENTOR
HARRY KAZAKOWITZ

Dec. 8, 1964     H. D. KAZAKOWITZ     3,160,439
HAND DUMP TRUCK

Filed June 27, 1963     3 Sheets-Sheet 3

INVENTOR
HARRY KAZAKOWITZ

United States Patent Office 3,160,439
Patented Dec. 8, 1964

3,160,439
HAND DUMP TRUCK
Harry D. Kazakowitz, 1849 Albemarle Ave.,
East Meadow, N.Y.
Filed June 27, 1963, Ser. No. 291,076
3 Claims. (Cl. 298—2)

This invention relates to hand dump carts or trucks such as used in gardening for moving dirt or other materials, in industry, in factories and shops, and in agriculture such as on chicken farms and the like. More particularly, the invention is directed to a novel hand dump cart or truck having improved leverage and improved fulcrum location for dumping or lifting loads or objects and including means for maintaining a dumping body in any relative tilted position with respect to a support frame to facilitate the dumping or lifting action.

Small hand dump trucks or hand dump carts are known, and have been used extensively for gardening purposes for moving dirt and the like. However, known hand dump trucks suffer from any disadvantages such as the great force required in dumping and in lifting material to be transported, limitations as to the degree of angular tilting movement of the dump body relative to a support frame, and deficiencies with respect to inability to maintain a dump body in a particular tilted position relative to a support frame.

An object of the present invention is to provide an improved hand dump truck or cart in which the disadvantages of prior hand dump trucks or carts are obviated.

A further object is to provide a hand dump truck or cart capable of being used, through improved location of fulcrum axes, to exert a great leverage with a relatively small amount of applied force, whereby the dump truck or cart may be used to lift and transport relatively heavy loads, objects, rocks, cans, drums, bushes, trees and the like, from place to place.

Still another object of the invention is to provide a hand dump truck or cart in which a dump body is pivoted to a frame and may be retained in any particular adjusted angular position relative to the frame, regardless of the position of the frame, to aid in lifting loads.

Another object of the invention is to provide a hand dump truck or cart including a water-tight dump body whereby fluids or solutions, for spraying, watering, and the like, may be readily transported from place to place.

A further object of the invention is to provide a hand dump truck or cart in which the dumping or lifting action is under complete control of the operator in all angular positions, thus eliminating any point of no control.

To this end, the dump truck of the present invention comprises a normally horizontal frame, on which there are a pair of wheeled transverse axles secured to the frame in spaced relation longitudinally thereof, and a handle rigidly secured to the frame to extend rearwardly therefrom. The frame is provided with a transverse pivot which is located forwardly of the front wheeled axle and preferably at the extreme forward end of the frame. A walled dump body is connected to the transverse pivot forwardly of the center of gravity of the body so that the dump body is normally gravity biased to rest on the frame. Releasable means are provided to retain the body thus resting on the frame regardless of the angular position of the frame.

An important feature of the invention comprises an adjustable interconnection between the frame and the body whereby the body may be retained in any desired angular position relative to the frame within its limits of tilting movement of the body about its pivot axis.

With the described arrangement, and with the pivot axis of the body being at the extreme forward end of the frame, the body may be tilted to a position wherein it is oriented at 180 degrees with respect to its rest position on top of the frame, and the truck may be moved over the ground while the body is in this position. The body preferably has an outwardly and upwardly sloping forward wall. Thereby, in the event it is desired to move a bush or a small tree from one location to the other, the body may be tilted about its axis to a position wherein its forward wall is brought level against the ground. The object, such as the bush or tree, is then tilted away from the dump body and the cart is moved forward to receive the object onto the forward wall. No lifting of the object is required. By exerting upward pressure upon the relatively long handle of the truck, the frame may be then tilted about the forward wheeled axis to any desired angular position and, by virtue of the retaining means, be held in such adjusted angular position. The tree or the like, having been tilted onto the sloping forward wall and, due to the great leverage afforded by the distance between the forward axle of the frame and the outer end of the handle, the tree may be readily lifted into the dump body. Such lifting will require little effort to be exerted upon the extreme end of the handle. During the lifting, if it is desired to maintain the forward wall at any desired angular orientation relative to the ground, the adjusting means may be maintained while the rear wheels of the frame are again engaged with the ground. The tree may then be transported in a substantially upright position.

Furthermore, due to the mentioned adjustability of the body through approximately 180 degrees about its pivot axis, the body, when inverted, may be used to spread a load, such as dirt or other other loose material, over the ground.

For an understanding of the principles of the invention, reference is made to the following description of a typical embodiment thereof as illustrated in the accompanying drawings. In the drawings:

FIGS. 4 through 7 are side elevational views illustrating the operation of the hand dump truck in performing a dumping operation;

FIG. 11 is a cross sectional view illustrating a removable screen which may be mounted on top of the body.

Figure 1:
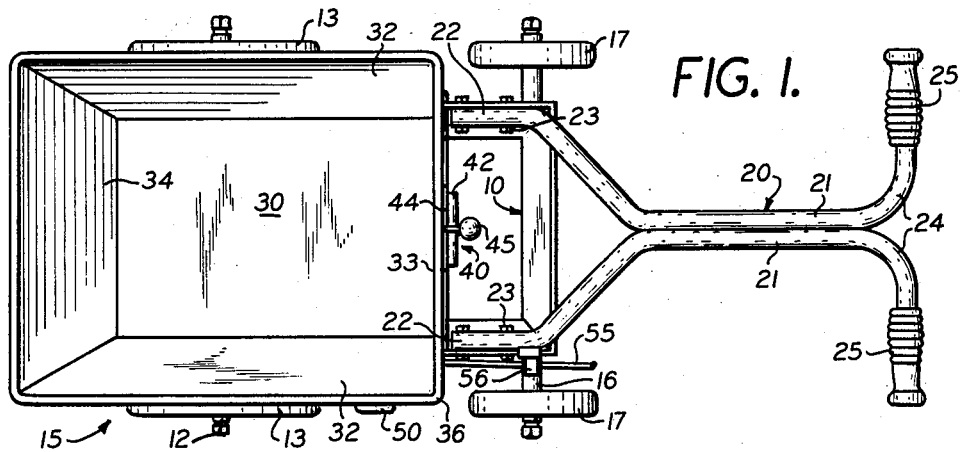
FIG. 1 is a plan view of a hand dump cart or truck embodying the invention.

Referring to the drawings, a dump cart embodying the invention is generally indicated at 15 as comprising a frame 10 having a rigid handle 20, and a dump body 30 which is tiltably mounted upon frame 10.

Frame 10 is a generally horizontal and rectangular frame having its sides and rear end formed of angle irons, metal tubes, or the like, and which may be welded or otherwise suitably connected to each other. Frame 10 includes a tubular cross section brace 11 extending transversely thereof near its forward end and welded to the angle irons on each side of frame 10, this brace functioning additionally as a body stop or support. The frame has a transverse front axle 12 on which are rotatably mounted relatively large diameter wheels 13. Adjacent its rear end, frame 10 is provided with a pair of strap iron brackets 14, 14 to which is brazed, welded or otherwise secured a rear axle 16 on which are rotatably mounted relatively small diameter wheels 17. The dimensions and interrelation of parts are such that, when wheels 13 and 17 are in engagement with a horizontal surface, frame 10 extends horizontally.

A relatively elongated handle 20 is rigidly connected to frame 10 so that it is movable as a unit with frame 10 and constitutes, with frame 10, a lever acting about either of the axles 12 or 16. Handle 20 is of tubular construction comprising a pair of tubes 21 which have substantially parallel forward ends 22 rigidly secured to the side members of frame 10 as by bolt and nut assemblies 23. The handle extends rearwardly and upwardly from frame 10 as by a relatively small angle for a short distance, and then is bent upwardly to extend upwardly and outwardly at a relatively sharper angle less than 90 degrees. Outwardly of inner ends 22, tubes 21 are bent first to converge toward each other and then to extend parallel to each other for the major portion of the handle length, the parallel portions of tubes 21 preferably being connected together as by welding, brazing or the like. The outer ends of tubes 21 are bent outwardly as at 24, and preferably provided with grips 25.

A tubular element 18 extends transversely of the extreme forward end of frame 10, being integrally secured thereto by welding, brazing or the like. This transverse tubular member 18 acts as a pivot for body 30. Body 30 is a generally hopper shape member, of metal or plastic, including a bottom wall 31, outwardly and upwardly sloping side walls 32, a substantially perpendicular rear wall 33, and a front wall 34 which slopes outwardly and upwardly at a greater angle than do the side walls 32. A reinforcing flange 36 extends around the upper edge of body 30. A substantially flat reinforcing frame 35 is welded or brazed to the outer surface of bottom wall 31, and the forward legs of reinforcing frame 35 are bent to form trunnions 37 which embrace tubular cross member 18 and thus form part of the pivotal interconnection between frame 10 and body 30. It will be noted that pivot axis 18 of body 30 is located substantially forwardly of front axle 12 of frame 10. By virtue of the illustrated pivotal mounting of body 30 on frame 10, body 30 may pivot through an angle of 180 degrees to a position substantially completely reversed or inverted from that shown in FIG. 2 and, in this inverted position, dump cart 15 may be moved by simply tilting the dump cart about rear axle 16 sufficiently to elevate body 30 above the ground. Alternatively, the body can be dragged along in contact with the ground.

Figure 2:
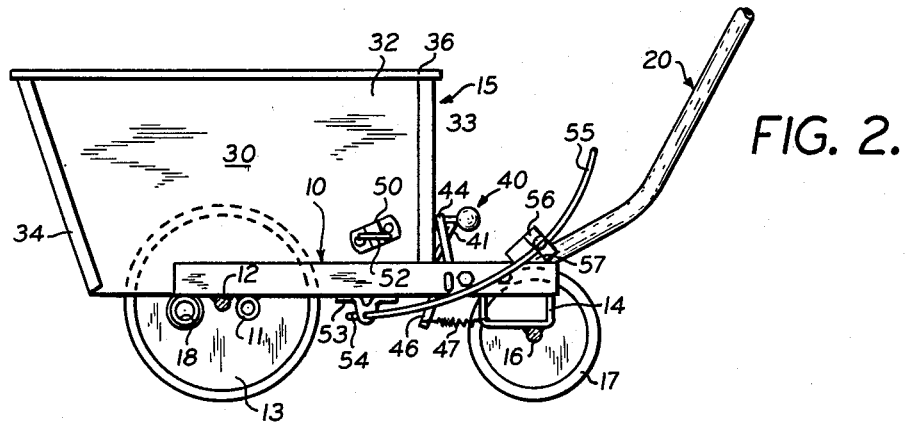
FIG. 2 is a side elevational view thereof, with a portion of the handle omitted.
Figure 3:
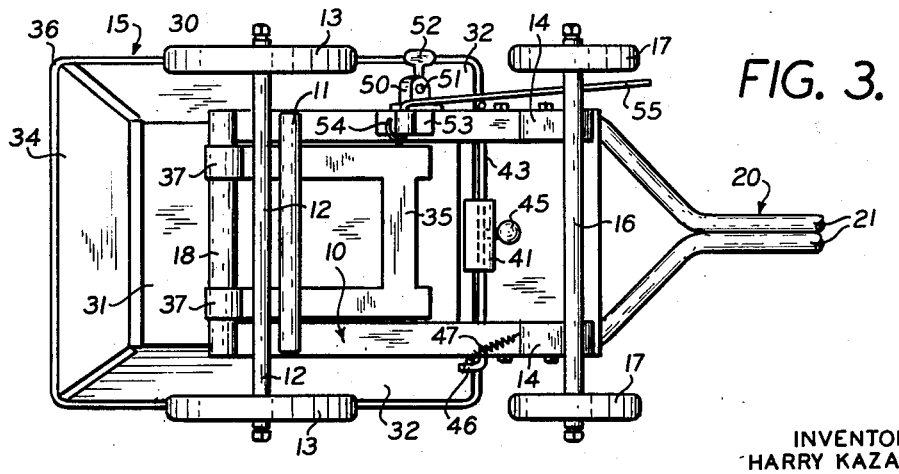
FIG. 3 is a partial bottom plan view of the hand truck.

The pivot axis of body 30, which comprises tube 18 and trunions 37, is located substantially forwardly of the center of gravity of body 30 so that body 30 is normally gravity biased to rest upon frame 10, as illustrated in FIG. 2. To maintain body 30 releasably latched against accidental displacement from its position shown in FIG. 2, a latch means generally indicated at 40 is provided.

Latch means 40 includes a fixed member 41 in the form of a metal strap bent into a substantially inverted wedge shape and having its ends anchored to rear wall 33 of body 30. Member 41 has a substantially horizontal upper edge 42 which is shaped for conforming configuration with the movable parts of latch means 40. The movable part of latch means 40 comprises a rod 43 extending through apertures in the opposite side walls of frame 10. Intermediate its ends, and between the side members of frame 10, rod 43 is bent to form a rectangular crank portion 44 which is axially relatively elongated, and an operating handle 45 is secured to portion 44. One end 46 of rod 43 is bent downwardly and a biasing spring 47 is secured between end 46 and a portion of the frame to bias the crank 44 to engage over the upper edge 42 of fixed member 41. Due to the wedge shape of fixed member 41, when body 30 is pivoted toward its rest position, crank 44 will be biased backwardly somewhat and then will be spring biased to engage over upper edge 42 of member 41, thus automatically latching body 30 in the position shown in FIG. 2.

As stated, adjusting mechanism is provided for maintaining body 30 in any adjusted angular position with respect to frame 10. This adjusting mechanism includes a block 50 secured to one body side wall 32 and formed with a bore 51 therethrough. A thumb screw 52 is threaded into block 50 so as to extend into bore 51. Cooperating with block 50 there is a longitudinally curved rod 55 pivotally mounted upon frame 10. For this purpose, a bracket 53 is secured to the underside of one of the side members of frame 10, and rod 55 has a bent end 54 formed to provide a transverse pivot extending through an aperture in bracket 53.

Normally, rod 55 is disengaged from block 50 and is releasably retained in a spring clip 56 secured on a block or bracket 57 mounted on frame 10 or handle 20. If it is desired to maintain body 30 in a predetermined angular tilted position with respect to frame 10, rod 55 is released from spring clip 56, latch 40 is disengaged, and body 30 is tilted up sufficiently to engage the end of rod 55 through bore 51 in block 50. Body 30 is then moved to the desired angular position, with rod 55 sliding through bore 51, and then clamp or setscrew 52 is tightened to anchor rod 55 against movement through bore 51 of block 50. This maintains body 30 tilted to the desired angular position.

It will be noted that a very substantial leverage can be exerted about either one of the axles 12 or 16 by virtue of the lever arm provided by frame 10 and relatively elongated handle 20, and the force required to exert this leverage is greatly reduced by virtue of the particular disposition of body 30 fore and aft of frame 10. FIGS. 4 through 7 illustrate the various manners in which body 30 may be tilted, utilizing to advantage the aforementioned greatly increased leverage.

Referring to FIG. 4, if a load of dirt or the like, as indicated at 60, is placed within body 30, it may be readily and easily transported as desired by maintaining wheels 13 and 17 in contact with the ground and pushing or pulling cart 15 by handle 20, either the front or rear wheels of the cart being lifted slightly when it is desired to change direction.

The operation of dumping the load is illustrated more particularly in FIGS. 5, 6 and 7. To dump a load of dirt or the like, handle 20 is elevated to tip the cart about the axle of forward wheels 13 until front wall 34 of body 30 is in engagement with the ground. It should be noted, at this point, that the spacing of front wall 34 from the axle 12 is such that, when the cart is tilted to the position of FIG. 5, front wall 34 will be in substantially flush engagement with level ground. Latch 40 is now released by operation of knob 45 and frame 10 may now be returned to a horizontal position, with both sets of wheels 13 and 17 in engagement with the ground, but with wall 34 of body 30 also remaining in engagement with the ground, as illustrated in FIG. 6. It will further be noted that the distance between tilting axis 18 and forward wall 34 is such that, in the position of FIG. 6, front wall 34 of body 30 will also be in substantially flush engagement with level ground.

The body 30 is now released for swinging about its tilting axis. To complete dumping the load, handle 40 may now be moved downwardly to tilt frame 10 about the axis 16 of wheels 17, elevating the forward wheels 13. Body 30 will swing counterclockwise, as viewed in FIGS. 4 through 7, to the position shown in FIG. 7 so that the body may be completely lifted from the ground, while in the inverted position, to complete dumping of the load of dirt or the like.

To pick up a load 60, the dump cart may be given the position of FIG. 5 and cart 15 may be moved forwardly so that forward wall 34 of body 30 will dig into load 60. After a sufficient amount of the load has been picked up, frame 10 and handle 20 may be swung counterclockwise about front axle 13 until frame 10 and body 30 are latched together. After the body has been latched to the frame, handle 20 may be swung clockwise to re-engage wheel 17 with the ground, this being greatly facilitated by the leverage provided by handle 20 with respect to either of the axles of the dump cart.

Figure 8:
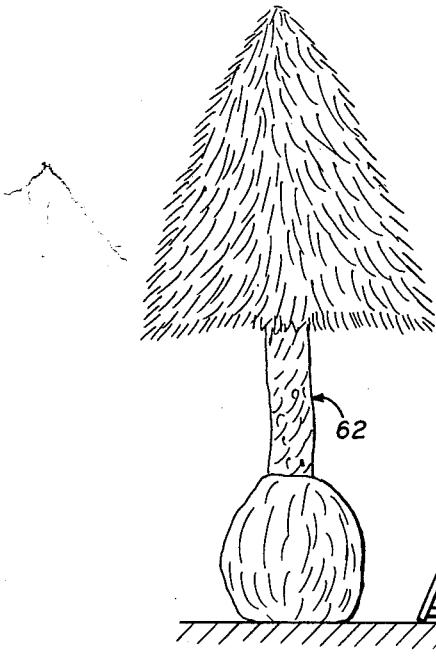
FIGS. 8, 9 and 10 are side elevational views illustrating the use of the dump cart in lifting and transporting a relatively heavy object, such as a large bush or a tree, for example.
Figure 9:
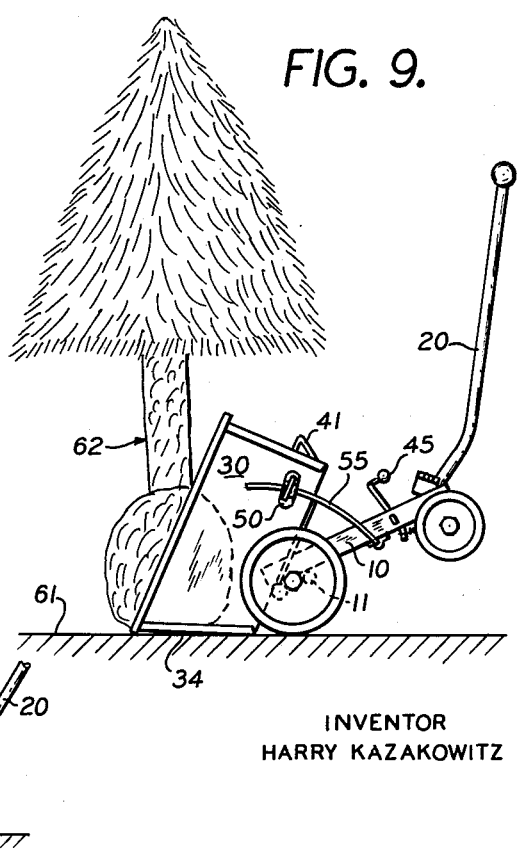
Figure 10:
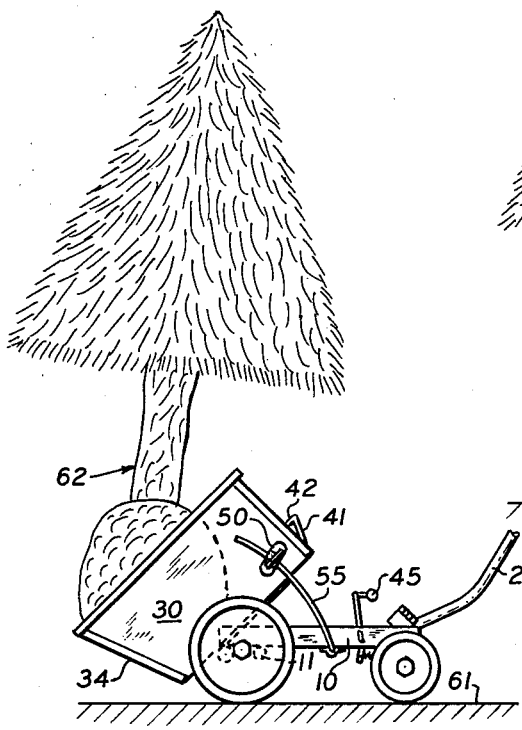

FIGS. 8, 9 and 10 illustrate the operation of the dump cart in lifting and transporting a relatively large or bulky object such as, for example, a tree or a large bush 62. The dump cart is first moved close to the tree 62, and then latch 40 is released so that body 30 may be tilted into a position in which its forward wall 34 is in flush relation with the ground 61. Rod 55 is disengaged from its clip 56 and positioned so that it may readily be inserted into the clamp 50. The position of the parts is now as illustrated in FIG. 8.

To lift tree 62, the tree is tilted away from the dump cart and the latter is advanced, with wall 34 remaining in contact with ground 61, to insert wall 34 between the bottom of the tree and ground 61. Tree 62 is then tilted so that it rests on the inner surface of forward wall 34.

Frame 10 is then swung upwardly about the axis of the forward wheels 13, as by lifting the handle 20. During this tilting of frame 10, rod 55 is inserted loosely through clamp 50 and, when the desired angular relation of the frame 10 to the ground and to the body 30 has been attained, clamp 50 is tightened. This is shown in FIG. 9.

Next, downward pressure is exerted on the outer end of handle 20 to tilt frame 10 back to a position in which both its forward and rear wheels are in engagement with ground 61. By the leverage exerted during this operation, tree 62 is lifted in supported engagement with the inner surface of wall 34. The tree may possibly slide inwardly along the wall 34 in the event that the latter has not been inserted sufficiently far beneath the tree. With all four wheels now in contact with the ground, the cart may then be used to transport the tree 62 to an unloading site. At the unloading site, a reversal of the steps mentioned above will unload tree 62 from the cart. For example, the frame 10 can again be tilted by upward pressure on handle 20 until wall 34 engages ground 61. By tilting tree 62 away from the cart, wall 34 may be withdrawn from beneath the tree. The body 30 may then be restored to its horizontal position on frame 10 and locked in position by latch 45.

As an ancillary feature of the invention, a sifting screen, generally indicated at 65 in FIG. 11, may be provided for body 30. Screen 65 includes a perforated bottom wall 66 below which extends a flange 67 arranged to fit within the rim 36 of body 30, and to have a shoulder resting upon the entire top periphery of rim 36. A side wall 68 extends upwardly from perforated bottom wall 66. Screen 65 may be used either positioned on top of the body 30 or removed therefrom. When screen 62 is placed on body 30, the volume carrying capacity of the body is substantially doubled, which is particularly important for transporting grass clippings, leaves and the like. Screen 65 further is useful when it is desired to support liquid, such as gardening solutions or the like, in body 30. The screen tends to stabilize liquid and liquid mixtures when they are being transported in a leak-proof body 30, this stabilization being due to the relatively small perforations of the screen.

While a specific embodiment of the invention has been shown and described in detail to illustrate the application of the principles of the invention, it will be understood that the invention may be embodied otherwise without departing from such principles.

What is claimed is:

1. A hand dump cart comprising, in combination, a substantially horizontal frame having an open forward end, said frame consisting of a pair of angle members extending along each side and opening upwardly and an angle member extending along the rear side and opening upwardly, a pair of wheeled transverse axles secured to said frame in spaced relation longitudinally thereof, a handle rigidly secured to said frame and extending rearwardly therefrom, a dump body including a bottom wall and upstanding side walls, the forward wall thereof sloping outwardly, a tubular transverse pivot member on said frame forwardly of the front wheeled axle, said pivot member being located at the underside and at the open end of said frame, said body being connected to said transverse pivot member forwardly of the center of gravity of said body whereby said body is normally gravity biased to rest on said frame, said body being tiltable forwardly relative to said frame, about said transverse pivot member for dumping of the body contents, said body being freely pivotable about said frame through an angle of substantially 180 degrees, and means on said frame and on said body adjustably interconnectable to maintain said body fixed in any predetermined angular relation relative to said frame, said body including a metal strap reinforcing frame juxtaposed to the bottom wall of said body and having legs formed with trunnions engaging said transverse pivot member for defining the pivot of said body to said frame.

2. A hand dump cart comprising, in combination, a frame, a front wheeled transverse axle secured to said frame spaced longitudinally from the front end thereof, a rear wheeled transverse axle secured to said frame toward the rear end thereof, a handle rigidly secured to said frame and extending rearwardly therefrom, a dump body including a bottom wall and upstanding side walls, a transverse pivot member secured to said frame at the front end thereof, means spaced rearwardly of the forward bottom edge of said dump body pivotally connecting said body to said pivot member, and a stop member secured to said frame rearwardly of said pivot member and adapted to be engaged by the bottom wall of said body when said body pivots about said frame through an angle of substantially 180 degrees.

3. A hand dump cart comprising, in combination, a frame, a front wheeled transverse axle secured to said frame spaced longitudinally from the front end thereof, a rear wheeled transverse axle secured to said frame toward the rear end thereof, a handle rigidly secured to said frame and extending rearwardly therefrom, a dump body including a bottom wall and upstanding side walls, a transverse pivot member secured to said frame at the front end thereof, means spaced rearwardly of the forward bottom edge of said dump body pivotally connecting said body to said pivot member, a stop member secured to said frame rearwardly of said pivot member and adapted to be engaged by the bottom wall of said body when said body pivots about said frame through an angle of substantially 180 degrees, and means on said frame and on said body adjustably interconnectable to maintain said body fixed in any predetermined angular relation relative to said frame.

References Cited by the Examiner

UNITED STATES PATENTS

| 2,037,222 | 4/36 | Farrar | 298—3 |
| 2,482,608 | 9/49 | Bedel | 298—2 |
| 2,767,886 | 10/56 | Jenkins | 298—3 |
| 3,000,671 | 9/61 | Monegato | 298—2 |

MILTON BUCHLER, *Primary Examiner.*

RALPH D. BLAKESLEE, *Examiner.*